US008447554B2

(12) United States Patent
Emami et al.

(10) Patent No.: US 8,447,554 B2
(45) Date of Patent: May 21, 2013

(54) SYSTEM, METHOD AND COMPUTER PROGRAM FOR REMOTELY TESTING SYSTEM COMPONENTS OVER A NETWORK

(76) Inventors: Mohammed Reza Emami, Richmond Hill (CA); Michael-Anthony Tedesco, Toronto (CA)

( * ) Notice: Subject to any disclaimer, the term of this patent is extended or adjusted under 35 U.S.C. 154(b) by 323 days.

(21) Appl. No.: 12/892,404

(22) Filed: Sep. 28, 2010

(65) Prior Publication Data
US 2011/0077892 A1  Mar. 31, 2011

Related U.S. Application Data

(60) Provisional application No. 61/246,399, filed on Sep. 28, 2009.

(51) Int. Cl.
*G01L 25/00* (2006.01)
*G01L 5/12* (2006.01)
*G06F 9/455* (2006.01)

(52) U.S. Cl.
USPC ............... 702/113; 318/799; 703/24; 714/34

(58) Field of Classification Search
USPC ................. 702/108, 113, 116, 119, 121, 122, 702/123, 145, 150, 188; 703/24, 26; 714/28, 714/34, 727; 73/116.05, 118.02, 862.18; 318/400.02, 799
See application file for complete search history.

(56) References Cited

U.S. PATENT DOCUMENTS

| 3,898,875 | A | 8/1975 | Knoop et al. |
| 4,807,467 | A | 2/1989 | Kugler |
| 5,623,104 | A | 4/1997 | Suga |
| 6,539,782 | B1 | 4/2003 | Drecq et al. |
| 2006/0195739 | A1* | 8/2006 | O'Brien ........................ 714/727 |
| 2009/0160394 | A1* | 6/2009 | Zhang et al. ................. 318/799 |

OTHER PUBLICATIONS

Gross, Charles A, Electric Machines, 2007, 84-88, CRC Press, United States.
B.J. Chalmers, Electric Motor Handbook, 1998, 458-462, Butterworth & Co. (Publishers) Ltd., United Kingdom.
Robert L. Norton, Machine Design an Integrated Approach, 2006, 879-880, Pearson Prentice Hall, United States.
Richard M. Chrisco, Automated, Full Load Motor Testing at Production Speeds, 1995, 337-343.
Martin O. Thurston, Handbook of Electric Motors, 2004, Taylor & Francis Group, LLC.

(Continued)

*Primary Examiner* — John H Le
(74) *Attorney, Agent, or Firm* — Norton Rose Canada LLP

(57) ABSTRACT

The invention is a turn-key, modular platform, including software and hardware, for testing physical system components such as motors remotely over the Internet. The system allows remote customers to test multiple physical system components under the specific loading conditions of the real-world application. This will provide more detailed and accurate information than what is usually given in the data sheets for system component performance, enabling the user to make a more-reliable decision. With respect to motors, the hardware consists of a torque motor that moves autonomously in xy plane to couple to the individual test motors, through a unique coupling mechanism, and emulate various load profiles on them. Test motors are mounted onto modular fixtures that allow for one-time manual positioning in xyz space. The software, consisting of server and target applications, creates user accounts and profiles, controls user access by means of a scheduler, and enables each user to connect to the hardware via Internet and run a customized experiment.

57 Claims, 9 Drawing Sheets

OTHER PUBLICATIONS

Gross, Charles A, Electric Machines, 2007, 84-88, CRC Press, Taylor and Francis Group, Boca Raton, FL, United States.

Chalmers, B.J. Electric Motor Handbook, 1988, 458-462, Butterworth & Co. (Publishers) Ltd., United Kingdom.

Norton, Robert L., Machine Design an Integrated Approach 2006, 879-880, Third Edition, Pearson Prentice Hall, United States.

Crisco, Richard M., Automated, Full Load Motor Testing at Production Speeds, 1995, 337-343.

The Institute of Electrical and Electronics, Inc., IEEE Std 113-1985, IEEE Guide: Test Procedures for Direct-Current Machines, 1985.

Emami, M. Reza and Martin, Adrian, Dynamic Load Emulation for Robotic Hardware-in-the-loop Simulation Platforms, University of Toronto, pp. 2207-2212, 2008.

Newton, Robert Wendel, Emulating Dynamic Load Characteristics Using a Dynamic Dynamometer, University of Newcastle, pp. 465-470, 1995.

Handbook of Electric Motors, Electrical and Computer Engineering a Series of Reference Books and Textbooks, Editor Martin O. Thurston, 2004 by Taylor & Francis Group, LLC.

* cited by examiner

FIG. 7A

SYSTEM, METHOD AND COMPUTER PROGRAM FOR REMOTELY TESTING SYSTEM COMPONENTS OVER A NETWORK

PRIORITY CLAIM

This application claims the benefit of U.S. Patent Application No. 61/246,399, filed Sep. 28, 2009, which is incorporated by reference herein.

FIELD OF THE INVENTION

The present invention relates to the field of testing, evaluation and selection of system components. The present invention more specifically relates to remotely testing mechanical system components such as motors over a network.

BACKGROUND OF THE INVENTION

A motor's torque/speed characteristics can be the most important factors when selecting a motor for a specific application. In both open-loop and closed-loop (servo) applications, the loading condition on a motor has critical effects on its dynamic response, efficiency, and power consumption, and the effect varies widely at different speeds. FIG. 1 shows an example of a torque-speed curve that is available for a typical brushless DC motor (24V, 50 oz-in NT Dynamo™ model, Hurst Manufacturing™). Information is also provided on current, efficiency and power output vs. torque.

The existing motor performance charts in the datasheets that manufacturers provide to potential customers are based on benchmark testing at a steady state. Not every possible torque load is actually tested to generate the datasheet charts. Instead, certain loads are applied to the motor to determine the corresponding performance, and the results of the benchmarking are curve-fitted to generate the torque-speed characteristic curve.

The Handbook of Electrical Motors (H. A. Toliyat & G. B. Kliman, Handbook of Electric Motors, Marcel Dekker Inc., New York, 2004) recommends that the user collect at least 7 data points reasonably spread out from no-load to 1.5-2 times the rated load. This information is made available to the customer for selecting the most appropriate motor for their specific application. Because the data points are fitted, the torque-speed combination read from the curve may not correspond exactly to the actual performance of the motor, even for a speed or torque value that was tested. A customer may require a more precise reading for the motor performance under the specific conditions it will operate at, as well as the motor's transient dynamics at the start-up or response to dynamic loads in order to select the most suitable motor for the application. For generating the information for a motor datasheet, the conditions under which the tests are to be carried out are very limited. For example, according to IEEE Std 113-1985 (IEEE Std 113-1985, IEEE Guide: Test Procedures for Direct-Current Machines), which provides guidelines for carrying out these tests, the tests should be carried out with the motor "hot" from continuous operation at the motor's rated load. In addition, the load should be gradually applied and removed until the results are consistent. The curve-fit should have an $R^2$ value of at least 0.9999 and individual data points should be off by no more than 0.25% from the curve. If these two conditions are not met, data points that vary the most from the curve should be retested. Therefore, the torque-speed curve presented in the datasheet does not give adequate information on the repeatability and variability of the motor performance under various load systems.

Some existing systems rely on computer simulation for providing the additional data points. Computer simulation, however, is a computation solution based on a theoretical model of a system. It would be more beneficial to provide an emulation based model. Hardware-in-the-Loop (HIL) simulations enhance purely computer based simulation by having actual components (as opposed to just models) providing information on their performance. Often these are the components that are hardest to model. Emulation is one of the tools available for performing HIL simulation.

There are also issues with coupling an emulation system to a motor under test. Prior Art coupling mechanisms, such as the multi jawed coupling shown in FIG. 2 are based on a toothed positive contact clutch. However, multi jawed couplings do not have a means for ensuring concentricity of the two shafts. In other words, there is no means to correct parallel or angular misalignment. These couplings are also severely limited in size; they cannot accommodate a shaft bore greater than ¼ inch. In addition, positive contact clutches do not have a means of orienting the two hubs to facilitate safe engagement. They are engaged while rotating, at speeds up to 300 rpm.

There exist several generic automatic couplings, some used in the context of a test bed. Dynamic load test systems are found mostly in academic literature and not in practical applications. Dynamic dynamometers have been used first to evaluate combustion engines, and more recently to evaluate electric motors. Dynamometers dissipate the power from a test motor by transferring it to a generator or by using a brake, such as a magnetic particle brake or eddy current brake. Due to their physics, dynamometers are heavy and bulky and cannot emulate fast dynamics. Thus, they are usually used for large-size motors and in situations where the high costs of their acquisition, installation, and maintenance can be afforded. A dynamic dynamometer is proposed in "Emulating Dynamic Load Characteristics Using an Dynamic Dynamometer" (R. W. Newton, R. E. Betz and H. B. Penfold, "Emulating Dynamic Load Characteristics Using an Dynamic Dynamometer", Proceedings of the IEEE Power Electronics and Drive Systems Conference, Singapore, February, 1995, pp. 465-470), which utilizes a DC motor to provide an active load. A block diagram of this system is shown in FIG. 3. The Experimental Machine for which dynamic performance characteristics are required is connected to the Load Machine via a torque transducer, though the torque transducer may be omitted if one has complete knowledge of the Experimental Machine.

Similar setups are found in U.S. Pat. No. 5,823,104 to Suga and U.S. Pat. No. 3,898,875 to Knoop et al. These are designed for testing the performance of electric motor for drive systems of automobiles during acceleration and deceleration.

U.S. Pat. No. 4,807,487 to Kugler, meanwhile, is for testing drive systems of vehicles using inertia masses. This system is for testing all components of the drive system, not just the rotational power source.

U.S. Pat. No. 6,539,782 to Drecq is for a load machine for a combustion engine test bench utilizing an eddy current brake and a reluctance motor. For combustion engines, in addition to applying an active resistive load, the motor needs to drive the motor at 40% of the full load in order to test the engine braking capabilities of the engine.

Automation Technologies Inc. has developed a system, called Digitorque™, for testing DC motors as they come off a production line to ensure quality control. They test motors for locked-rotor current and torque, pull-up torque, breakdown torque and speed, and full load speed, current and power. A simplified model of the Digitorque architecture is shown in FIG. 4. The results are compared to the characteristics of a "master motor" to ensure that they are within the acceptable limits. However, because each motor has to be tested as it comes off the production line at production speed, the Digitorque system requires an automated means of coupling test motors coming off the production line to the test fixture. Three solutions are offered depending on the size and type of the test motor. For small, low-power motors, a test fixture assembly consisting of a centering mechanism (not described), a collet for clamping to the motor shaft, a shaft flywheel and an encoder is used. For motors such as automotive-type DC starters with a gear end, the motors are mounted on a pallet during assembly, gear down, and the fixture assembly with mating gear was moved to engage with the test motor. For pump motors, a coupling using two unidirectional clutch bearing is used, as shown in FIG. 5. However, while these solutions do allow for automated coupling, they are specific for the motor being tested.

Therefore, there is a need for a system that allows motor manufacturers and vendors to offer their customers the ability to test available motors themselves under the specific load conditions the motor will ultimately be subjected to in its real-world application while the customers are making decisions about the suitable motor to acquire.

SUMMARY OF THE INVENTION

The present invention provides a test platform for enabling the testing of one or more system components, the test platform comprising: (a) one or more test fixtures for mounting one or more system components; (b) a load emulator; (c) a coupling for linking the load emulator to a selected system component to enable a load to be applied to the selected system component; and (d) a positioning system operable to selectively position the coupling so as to link the load emulator to the selected system component.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF THE DRAWINGS

FIG. 7a illustrates and example user interface for enabling a customer to access and execute instructions for operating the test platform.

DETAILED DESCRIPTION

Figure 1:
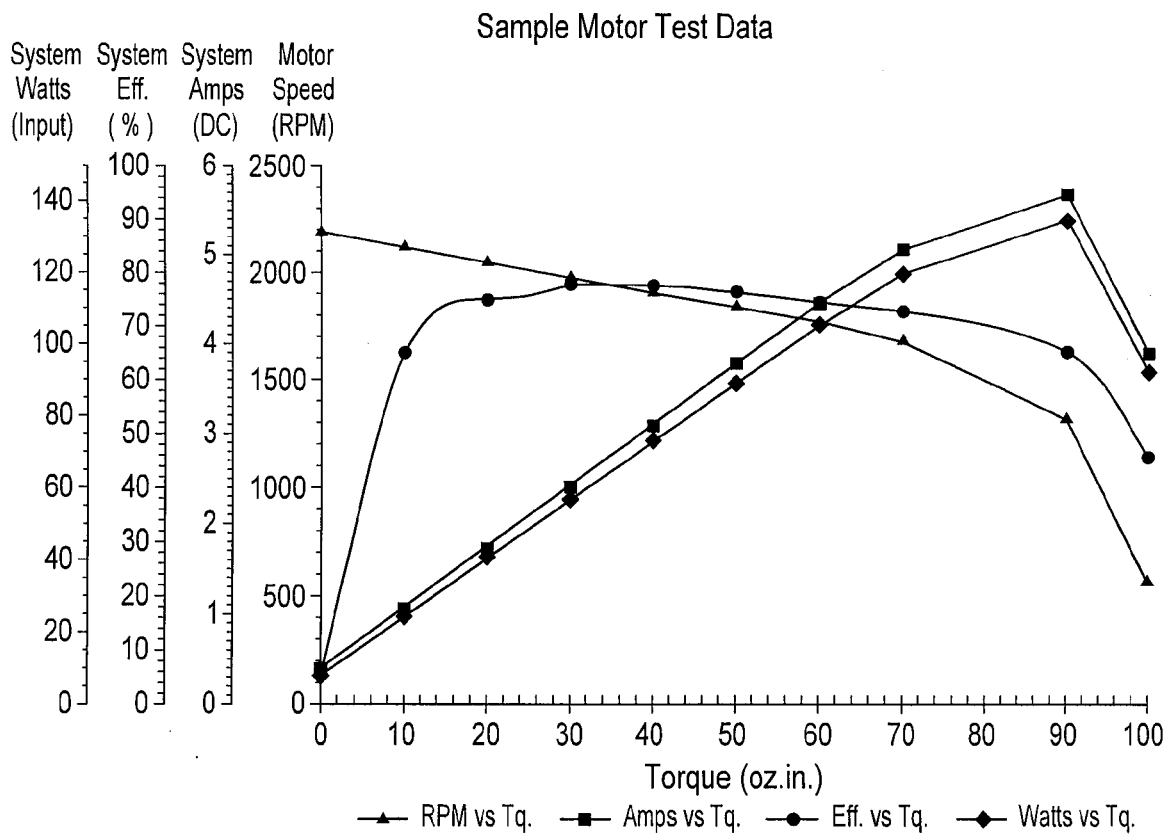
FIG. 1 illustrates a torque-speed curve for available models of 12 Volt motors from Hurst Manufacturing™.
Figure 2:
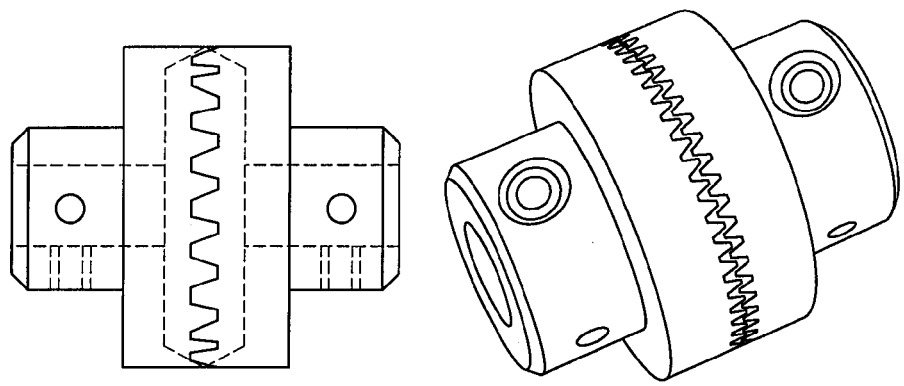
FIG. 2 illustrates a multi jawed coupling of the prior art.
Figure 3:
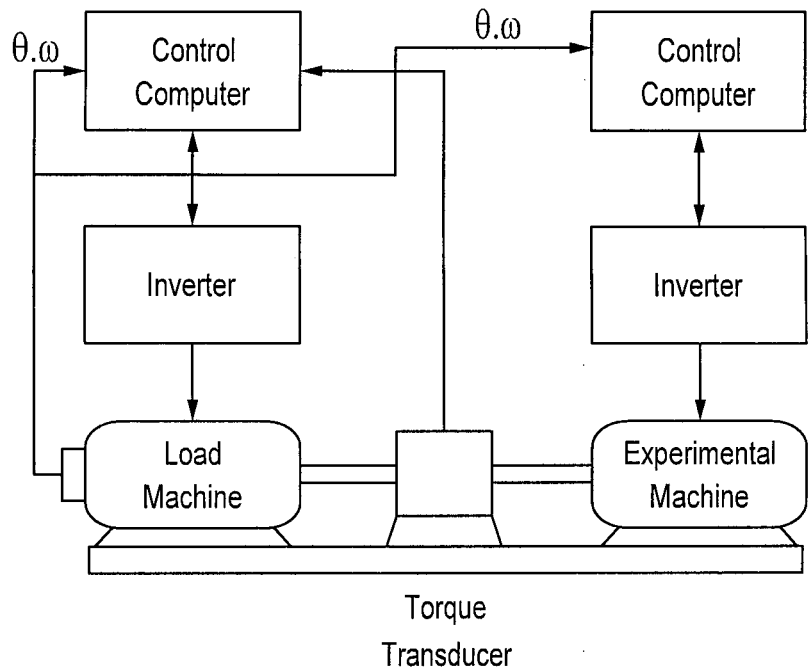
FIG. 3 illustrates a system diagram of a dynamic dynamometer of the prior art.
Figure 4:
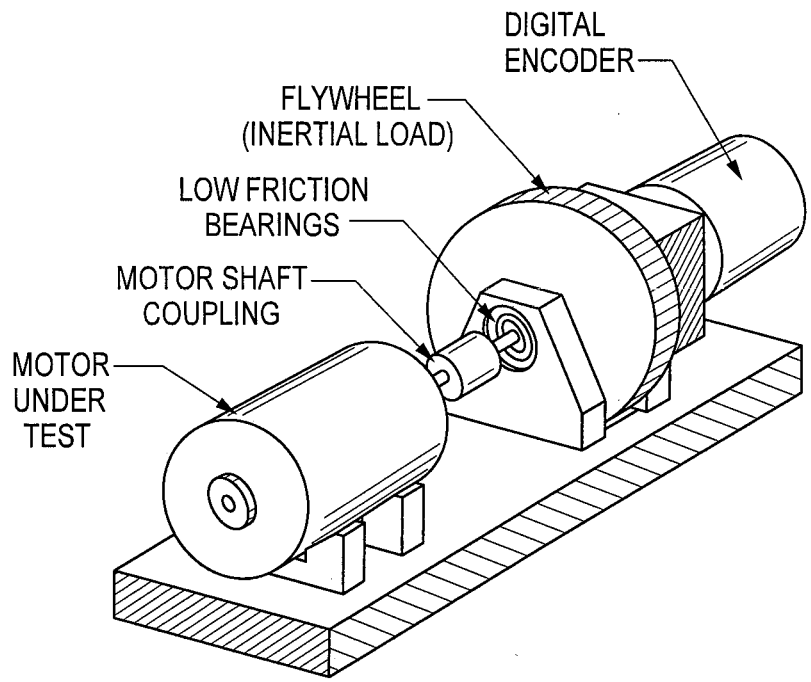
FIG. 4 illustrates a digitoque fixture of the prior art.
Figure 5:
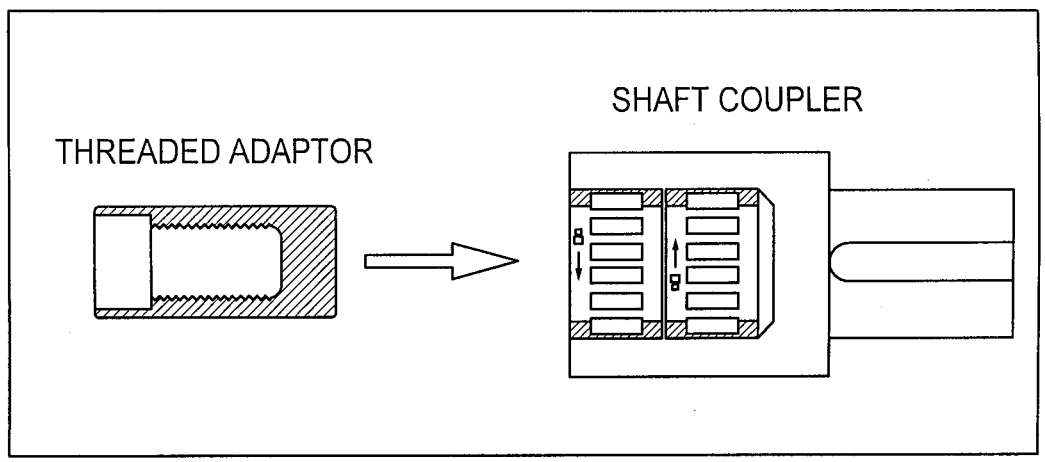
FIG. 5 illustrates a threaded adapter and shaft coupler utilizing two unidirectional clutch bearings of the prior art.

The present invention provides a test platform for enabling the testing of one or more system components. The test platform enables a load emulator to apply a load to the one or more system components. A coupling is provided for linking the load emulator to a selected system component to enable the load to be applied. A positioning system is operable to selectively position the coupling so as to link the load emulator to the selected system component.

For example, the system components may be one or more motors and the test platform may be a motor test platform. In this particular implementation, the motor test platform may also be provided with a tapered jawed assembly for eliminating torsional misalignment between the load emulator and the selected motor (to be tested) and enabling the coupling of any of the motors with no backlash. Other potential system components that can be tested in accordance with the present invention include, for example, motor drive systems, transmission mechanisms (such as harmonic drives, planetary gear boxes, etc.) and rotary internal combustion engines such as Wankel engines and gas turbines. It should be understood that while testing of motors is discussed in this specification, the invention is not limited to testing of motors in any way.

The present invention also provides a system enabling a customer to remotely test one or more system components over a network. For example, a customer, manufacturer, dealer, etc., may access a user interface to configure the test to be conducted by means of the test platform, which can be equipped with one or more system components. For example, in the case of motors, the test platform may carry out the testing of one or more of the motors in accordance with one or more parameters provided by the customer, and the system may provide test results to the user interface for displaying characteristics of the motors to the customer.

In the case of motors, the invention enables customers, prior to their purchase, to be provided with access to more accurate information on steady-state torque-speed performance of available motors, including performance consistency and repeatability. Customers may also be provided with access to more information on the dynamic performance of the motor including hysteresis (path dependence) as well as transient performance at start-up and under a dynamic load profile. The latter is particularly crucial as each application has a unique dynamic load profile that no standardized test can fully encapsulate. Customers may also be provided with access to information on motor efficiency based on measurements of applied voltage and current. Finally, because they are running the tests themselves, customers with appropriate knowledge and background can have greater confidence in the integrity and applicability of the results. By providing more and better information than is currently available, this technology will reduce the inherent risk in acquiring a motor by reducing the uncertainties in the available data. The customers will be better able to match motors to applications, resulting in a more efficient use of resources.

In the case of system components other than motors, the load emulator is selected such that it enables testing of the system component to provide useful data. Nevertheless, the load emulator as described herein may be operable to at least test motors, drive systems, and transmission mechanisms, such as harmonic drives, planetary gear boxes, etc. In other applications, the customer may configure the one or more parameters to obtain useful results for effectively evaluating the system component in an environment substantially similar to that of the end use.

From a system component manufacture's perspective, the present invention reduces the hassle of returns as a result of customers' incorrect system component selection. It can also serve as an advertising means for promoting system components, as a sales tool for getting a customer to select a system component from a manufacturer that provides this capability over a system component from a manufacturer that does not, and as a customer service tool by enhancing customer satisfaction with their system component purchase, resulting in more returning customers. Given the choice between two alternatives, it is reasonable to assume that the purchaser would select a system component with more available information and a chance to try it out before purchase.

Figure 6:
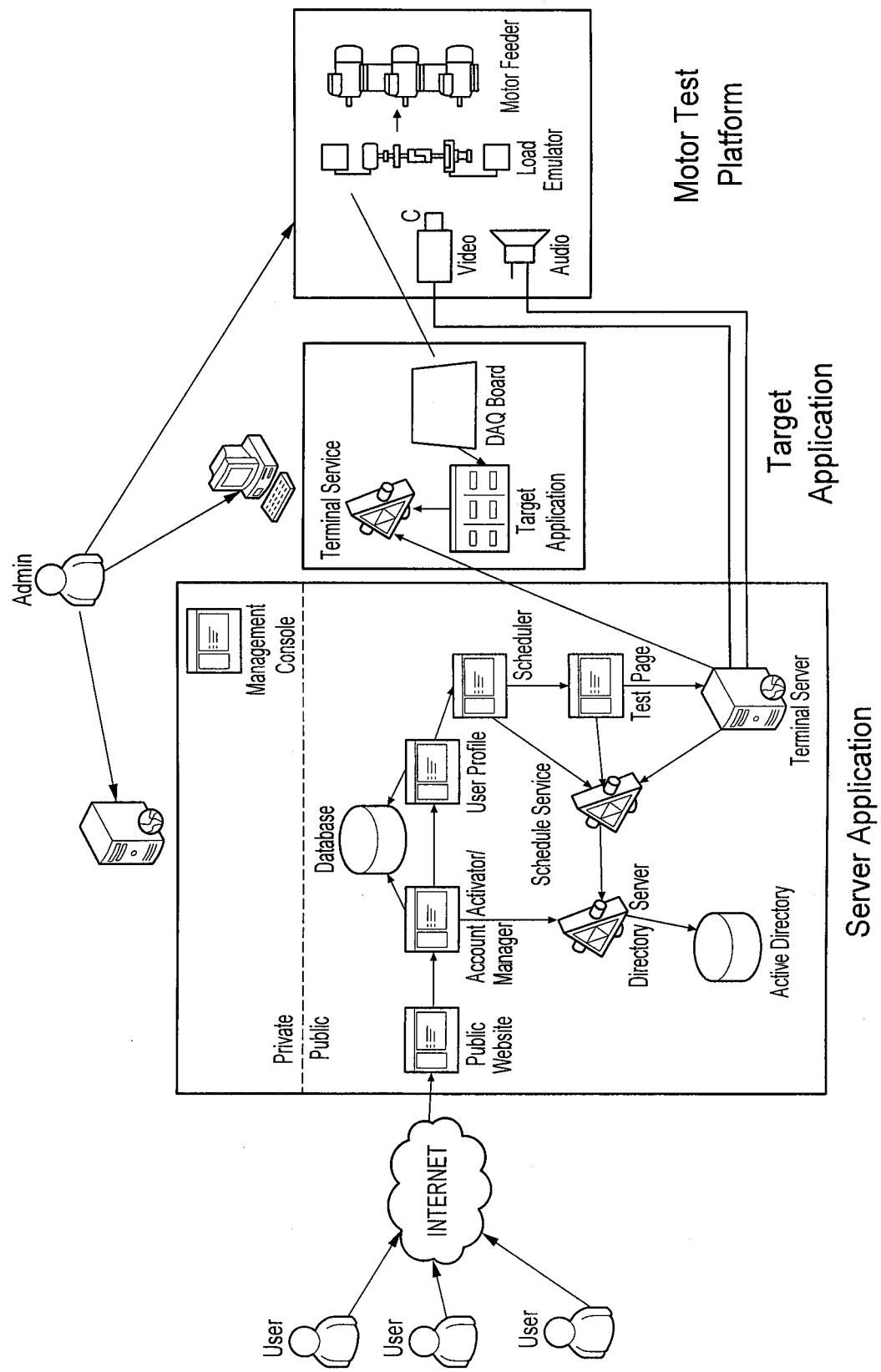
FIG. 6 illustrates a particular system architecture in accordance with the present invention.

FIG. 6 illustrates a system architecture wherein the system components are one or more motors and a test platform in accordance with the present invention is accessible to a customer by a network. The system may comprise a test platform linked to the network by a data acquisition interface. The system may further comprise a server linked to the network, the server operable to obtain one or more test parameters from a customer. The customer may provide the one or more test parameters by means of a client computer linked to the network.

A network accessible test platform in accordance with the present invention is operable on a distributed and networked computing environment. This includes implementation of the invention based on Internet-based technology development and service development wherein users are able to access technology-enabled services "in the cloud" without knowledge of, expertise with, or control over the technology infrastructure that supports them ("cloud computing"). Internet-based computing further includes software as a service ("SaaS"), distributed web services, variants described under Web 2.0 and Web 3.0 models, and other Internet-based distribution mechanisms. In order to illustrate the implementation of the present invention in such distributed and networked computing environments, including through cloud computing, the disclosure refers to certain implementations of the invention using network accessible computers. It should be understood that the present invention is not limited to its implementation on any particular computer system, architecture or network. It should also be understood that the present invention is not limited to a wired network and is implementable using mobile computers and wireless networking architectures, for example by linking wireless devices to the system by a wireless gateway.

The test platform, described more particularly below, may be provided with a load emulator, a positioning system, one or more test fixtures and a coupling. The one or more test fixtures enable the mounting of one or more system components to the test platform. The coupling links the load emulator to a selected system component to enable a load to be applied to the selected system component. The coupling may, for example, be a tapered jawed coupling, enabling the linking of the selected system component with the load emulator in such a way that any torsional misalignment is eliminated and the couplings of the system components are fully engaged with no backlash.

In use, a customer may initiate a link from the client computer to the server over the network. A server application linked to or executable on the server may schedule a customer-selected time interval for the operation, provide a user interface to the system, manage the operation of the system, and manage customer accounts and storage of test information.

The server application may be configured to provide a user interface to the customer, for example using web pages. The customer may navigate the web pages to initiate the creation of a customer account that is stored on a database linked to the server. The server application may also manage scheduling of customers that desire to perform tests of the system component.

A customer may configure test parameters, for emulating an environment matching that of the target use of the system component, using the user interface. The test parameters may be communicated from the server application to the target application where instructions may be configured for carrying out a test in accordance with the test parameters. The instructions may then be communicated to the test platform, which may select one or more appropriate system components under test and perform testing on the system components.

The test results may be collected by the target application and sent to the server application, where they may be stored in a database, accessed only by the customer, and presented in graphical or textual form to the customer using the user interface. The customer may then evaluate the potential of purchasing one or more of the system components for the target use. The customer may also perform further testing on one or more of the system components, log off, or be logged off the server application by the scheduler.

In addition to the above-mentioned specific implementation, the server application may be used to make laboratory apparatuses remotely accessible, for research and education purposes.

The server application may be a collection of libraries, network accessible web pages and utilities provided on one or more servers that enable the remote connection of registered customers to the target application in a controlled manner. The one or more servers may typically be operated by a motor manufacturer or vendor, for example.

The server application may be accessible to one or more customers over a network such as the Internet. The customer may access the server application through a public website, such as in a Software-as-a-Service (SaaS) model, for example. The server application may include an account manager for enabling a remote customer to create and manage a customer account (or customer profile), which may be stored and accessed using a database. It may also control customer access by means of a scheduler, which can modify customer's permissions using the customer account to grant or block access to the test platform. If the customer has permission to access the test platform, it may be provided with a test page for configuring the parameters of the test, which a terminal server may obtain to generate customer commands. The terminal server may communicate the customer commands to the target application, and may also be provided with an audio/video interface for recording audio and visual stream from the test platform.

The account manager may enable registration of new customers through an account activation web page, which may initiate the account manager to create a customer profile and personalized web page for the new customer as well as set its privileges and quotas. The information in the customer profile may be stored in the database. The account manager may also enable a returning customer to log on to the system using the account management web page, which may verify the customer's identity by a directory service accessing an active directory and directing the customer to their personal web page.

The scheduler may include a test schedule web page and a scheduling service. The schedule web page may display to the customer the availability of time slots for system component testing, and allow the customer to reserve an available time slot. The scheduling service may maintain the schedule for the test apparatus. At the appropriate time, it may grant the customer access to log onto the system to conduct their tests, and when their time has expired, it may log them off.

When the scheduler gives permission to a customer to begin a test, a test web page may be provided to the customer. This web page may comprise frames for video-audio feed of the test setup, an audio signal, as well as a remote desktop frame displaying the user interface on the target computer. This interface may enable the customer to run the test according to their own specifications and may enable the server to record the test data that is generated. The management console may be a utility that provides the interface for an administrator to set up and maintain the remote access software.

The target computer may execute or may be linked to a target application. The target application may provide the customer commands to the test platform and record the output generated by the test by means of a data acquisition (DAQ) interface. The test output may be communicated to the terminal server.

Figure 7A:
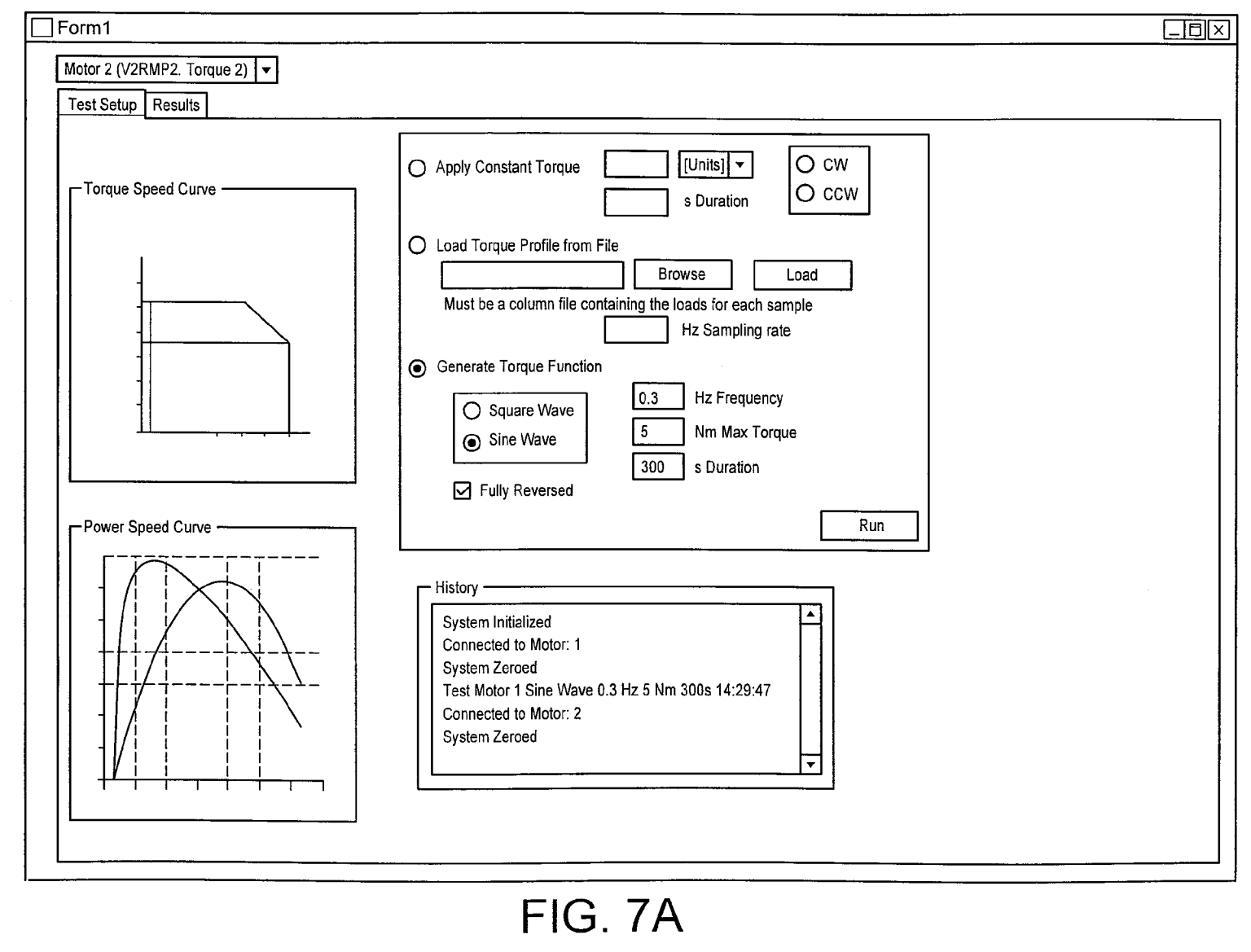
Figure 7B:
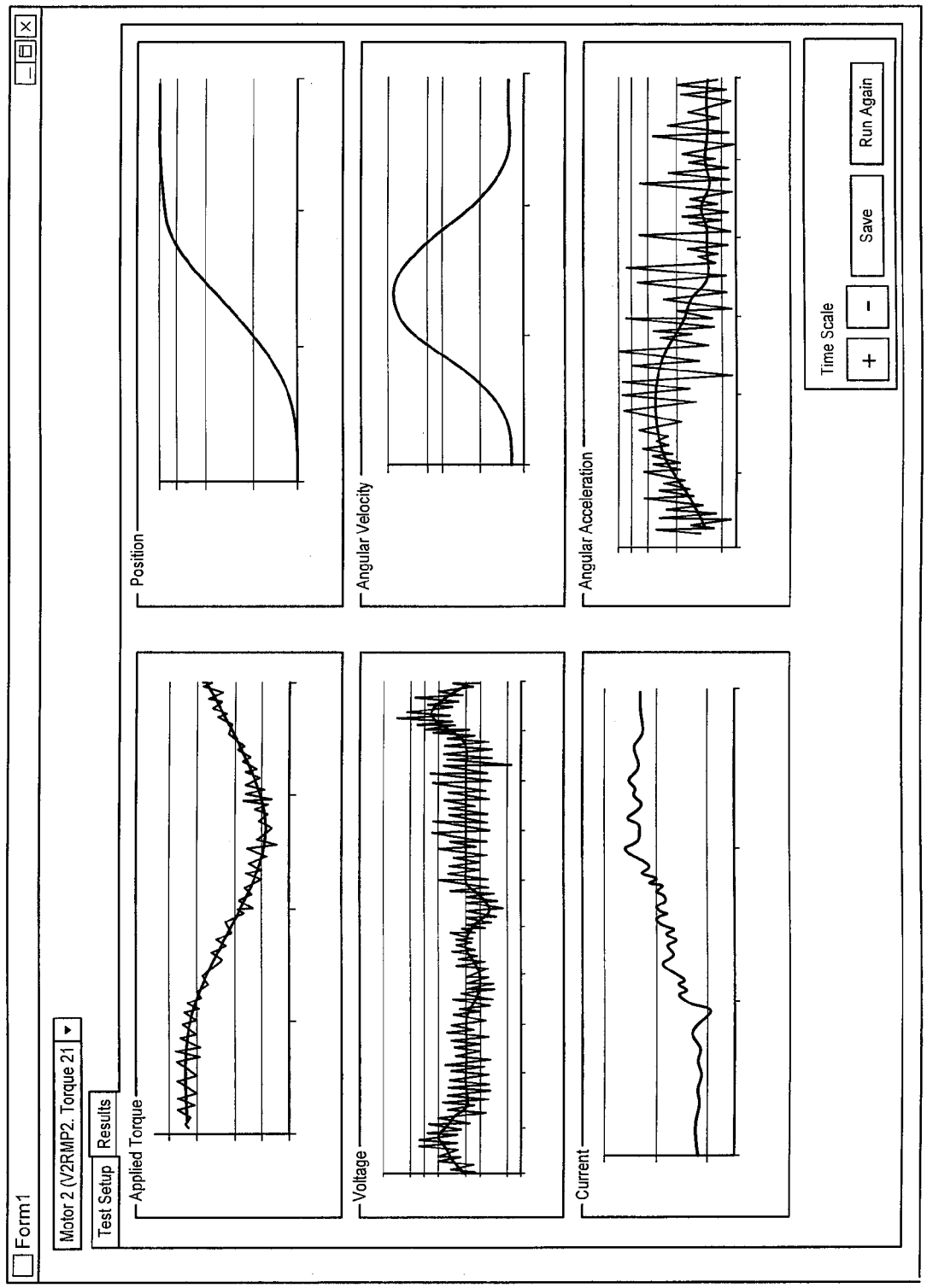
FIG. 7b illustrates and example user interface for enabling a customer to access and execute instructions for operating the test platform.

When the scheduler of the server enables a customer to begin the test, the test web page may be provided to the customer. The test page may comprise a video-audio feed of the test, as well as an interface frame prompting the customer to log on. The interface frame may provide the customer with a remote desktop connection to the target computer that presents the user interface. FIG. 7a and FIG. 7b illustrate example user interfaces for enabling a customer to access and execute instructions for operating the test platform.

Customer commands may be sent to the test platform via the DAQ interface. The DAQ interface may also collect the relevant data regarding test results, including for example applied torque, velocity, applied voltage and applied current. This data, as well as information calculated from the data such as position and acceleration may be saved by the server to the customer's profile for future analysis.

For example, a potential customer, having logged onto the test page via the website, wishes to evaluate and compare available system components. A drop down menu in the top left corner may display all the available system components, with basic ratings (torque, speed, voltage, etc). Selecting a given system component brings up additional data currently available through data sheets, such as torque-speed and power speed curve. From the available information, an initial evaluation of the available system components may allow the customer to eliminate some or many of the system components, reducing the number of system components that require full dynamic testing. When a candidate system component is identified, the customer may send the command for the test platform to access the desired system component. The test platform may then execute a positioning sequence, described below. Once the load emulator has engaged the desired test system component, the control software for the test system component may be accessed. With the system component running, the customer may select which type of load to apply to the test system component, for example a constant load, a sinusoidal load, or a unique profile load provided by the customer. Upon completion of the test, the data may be stored in the customer's profile for future analysis.

The test platform may be provided with a torque motor to emulate the loads a test motor may be subjected to in real world applications, in order to assist the customer in selecting the most appropriate motor for their application. The torque motor may be an electric DC gear motors or a motor operating at moderate speeds (including for example, those operating under 1000 rpm) such as DC brush and brushless, stepper, AC synchronous and induction, and even internal combustion engines and turbines. The invention provides essential information about torque/speed and dynamic behaviours used to differentiate and select motors in both open-loop and closed-loop (servo) applications.

Figure 8A:
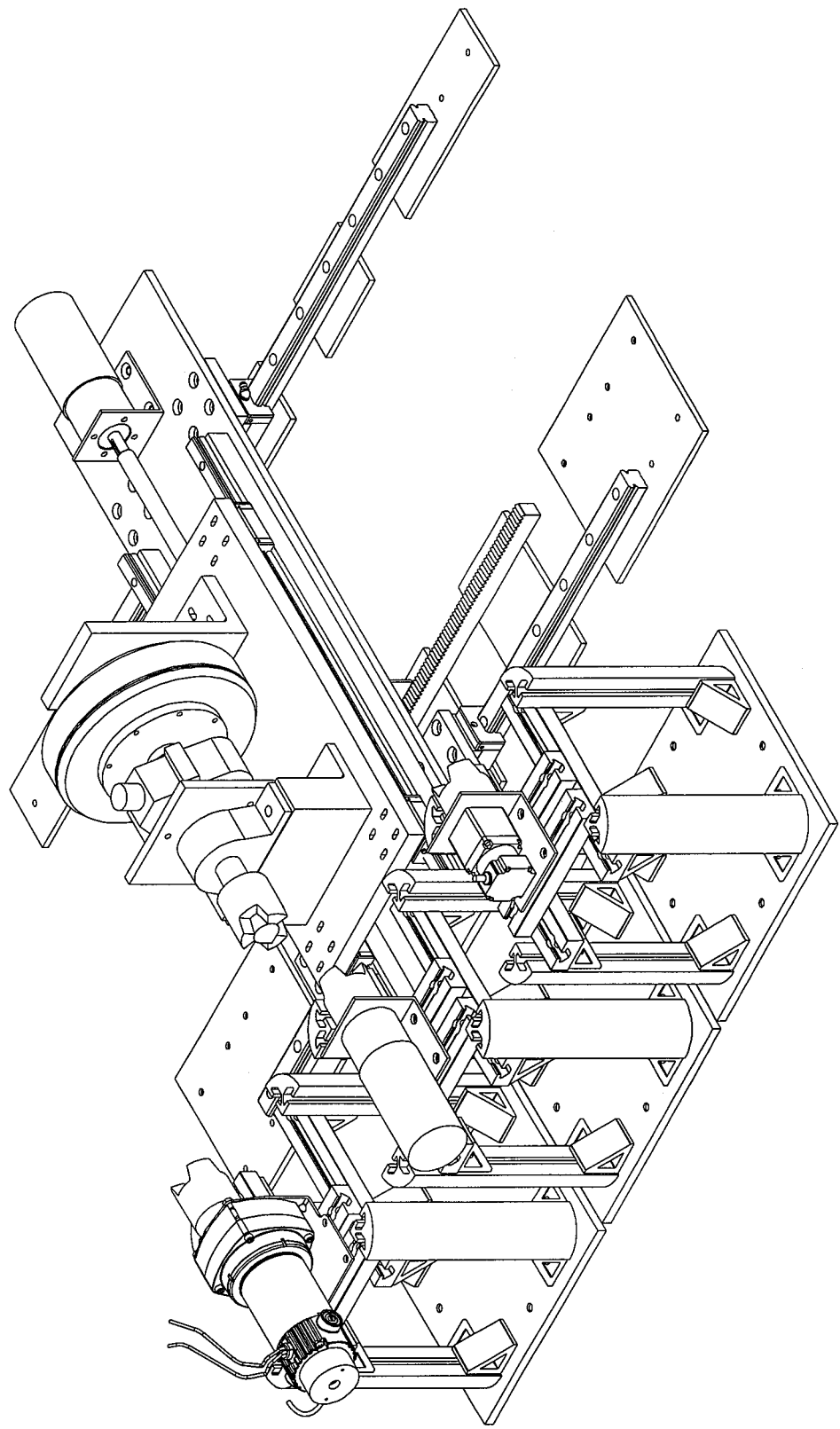
FIG. 8a illustrates a top perspective view of a test platform for the system.
Figure 8B:
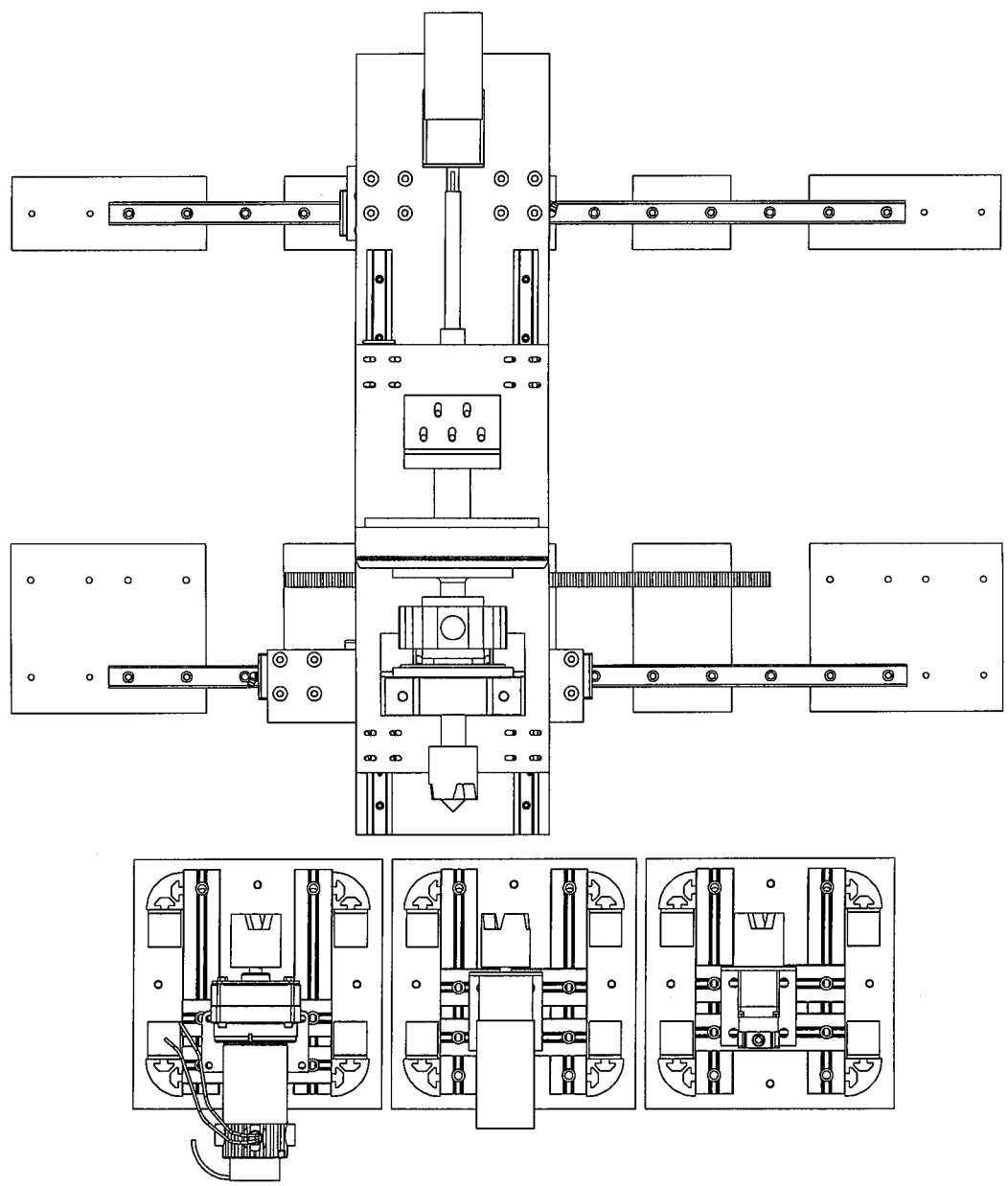
FIG. 8b illustrates a top view of a test platform for the system.

FIG. 8a and FIG. 8b illustrate views of a test platform for the system. The test platform may comprise a load emulator, a positioning system, one or more test fixtures and a coupling. The one or more test fixtures enable the mounting of one or more system components to the test platform. The coupling links the load emulator to a selected system component to enable a load to be applied to the selected system component. The coupling may, for example, be a tapered jawed coupling, enabling the linking of the selected system component with the load emulator in such a way that any torsional misalignment is eliminated and the couplings of the system components are fully engaged with no backlash.

The system components may be motors, for example, that operate in rotational movement along one or more test axes. The positioning system may be operable to align the coupling coaxially with the test axis of the selected system component.

For emulation, the load emulator may be used to apply dynamic loads to a test system component, in order to get information on the position, velocity and acceleration of the test system component, as well as applied current and voltage to the test system component. The load emulator should provide sufficient torque to cover the required load range, and that the inertia of the system component should be low enough that the load emulator is able to apply and remove loads quickly. A torque motor may provide this combination of strong but fast response.

The load emulator may be powered by a motor driver which receives commands from the target application via the DAQ interface. A reaction torque transducer mounted behind the load emulator may provide feedback on the applied torque, while a tachometer mounted onto the torque motor shaft may provide velocity feedback, from which information on position and acceleration can be calculated. The test system component, coupled to the load emulator, may be controlled with its own driver.

In one implementation, where the one or more test fixtures are disposed substantially linearly and perpendicular to the test axes, the load emulator may sit atop perpendicular first and second linear rails that allow smooth movement of the load emulator. The load emulator may move, on the first rail or rails, forwards to engage and backwards to disengage the test system components by means of the coupling. The load emulator may move, on the second rail or rails, sideways to go to another test system component. The rails on which the load emulator moves sideways may be extended to any length to reach any number of test system component. When connected to a system component, the system preferably is as rigid as if the load emulator and test system component were mounted directly onto the ground. There is preferably zero play between the carriage and the rail, and the carriage must be locked in place. To achieve the first requirement (no play), preloaded carriages may be used. The ball bearing in the carriage that allows for near-frictionless motion along the rail may be just microns larger than the groove on the rail in which they sit. For example, a difference of four microns may be provided.

When the carriage is forced onto the rail, the ball bearings may be compressed to fit into the groove. As a result, the carriages may be able to move only along the rail, the only desired degree of freedom. An electromechanical brake may satisfy the second requirement. Once the load emulator is positioned and engaged with the test system component, the electromechanical brake may engage, providing the ability to resist up to a force of 1000N. The lateral motion may be provided by a rack or linear induction rail. Each test fixture or system component may have a magnet, which may be detected by a Hall Effect sensor on the platform. The Hall Effect sensor may provide a change in voltage when exposed to a magnetic field. The system may be configured to track its current position with regards to the test system components (for example by homing the system on start-up). A system component index database may be provided to store the location of each test system component relative to the home position. In addition, each test system component may be identified by a Universal Product Code (UPC) through a bar code that may be attached to the test system component and can be read by a scanner that may be mounted on the load emulator. In this case, the system component index database may contain the UPCs of test system component and their order in the test platform.

As the platform moves, the sensor may count the number of magnets and increment the platforms position until the actual position corresponds to the desired position. Alternatively, the test system component may be recognized by its bar code read by the scanner on the load emulator, while the Hall Effect sensor may only ensure that the test system component is at the correct position for engagement with the load emulator. The load emulator may then be opposite the desired test system component and ready to begin the engagement sequence. The position of the magnets for the test system component may be adjustable such that when the sensor passes the magnet, the load emulator and test system component are close enough for the coupling mechanism to compensate for any remaining offset. The forwards/backwards motion of the load emulator may be provided by means of a self locking lead screw, which cannot be back-driven.

Figure 9:
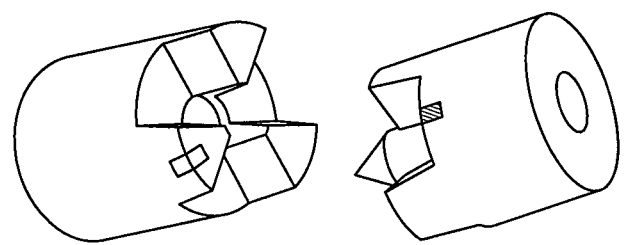
FIG. 9 illustrates a tapered jawed coupling for the coupling mechanism of the test platform.

The coupling mechanism may be based on a jawed spider coupling. Spider couplings comprise a pair of hubs with rectangular jaws and an elastomer insert. Although typical spider couplings require manual coupling of the two shafts, in the jawed spider coupling of the present invention the teeth may be tapered such that there is more space at the top than at the base of the tooth. FIG. 9 illustrates a tapered jawed coupling for the coupling mechanism of the test platform.

The tapered jawed coupling ensures that as the hubs are brought together, any torsional misalignment may be eliminated, and the couplings may be fully engaged with no backlash. The coupling mechanism may detect when the two couplings are rotated such that it is safe for them to engage. The couplings may be brought close together until the tips are nearly touching. The torque motor may rotate with a speed control loop. Magnets at specific points on the coupling may increase the torque required to rotate the shaft. The torque sensor may detect the increased torque and it may therefore know the relative position of the two hubs. The torque motor may then rotate a known amount more to ensure clearance.

The screw motor may then drive the load emulator forward with just enough torque to overcome the friction of the system. Once the couplings are fully engaged, the screw motor may no longer able to rotate, because the resistance from the motor may result in more torque required than is available. In addition to the tapered teeth, the couplings may have a male/female conical locator that adjusts for lateral misalignments resulting from the load emulator moving sideways to the selected system component. Other solutions that could be used include pneumatic or hydraulic collets which would clamp to the shaft of selected system component, or magnetic couplings that use a magnetic field to transfer torque from the load motor shaft to the selected system component shaft.

Each test selected system component may be mounted onto a test fixture that may comprise a system component bracket. The test fixture and system component brackets may be constructed from slotted extruded aluminium profiles. The slotted nature of the extruded aluminium may allow for the relative positioning of the pieces in xyz space, which provides the ability to manually change the height and forward positioning of the test system components. It may also allow for flexibility with regards to mounting the system component brackets, since the system component brackets are unique to each system component and may be provided by the system component manufacturer. Once the test system component is mounted and its position in xyz space is set, the system component may be locked in place and cannot be adjusted while tests are running.

For example, a test setup may have six motors. The load emulator may be currently coupled to the motor with index value of three (therefore, the load emulator position value is also three). A command is received from the customer to move to the motor with index value five. In the case of using UPCs for the test motors, the motor index database may specify in which direction the load emulator must move.

The screw motor reverses the load emulator, either running for a pre-calibrated amount of time, long enough to ensure that the couplings disengage and clear the test motor (as is currently done), or until a limit switch is reached. The load emulator then begins to move lateral in the direction of increasing motor indices.

Each time the Hall Effect sensor passes the magnet of a test motor, the load emulator position value is incremented, then compared to the desired value. If the values are equal, the load emulator stops its lateral motion (though the brake does not yet engage). In the case of using UPCs for the test motors, the scanner on the load emulator may read the bar code of each test motor that it passes by and may compare the scanned data with the information in the motor index database.

The load emulator is brought forward until the tips of the coupling teeth are almost touching, which can be achieved by a Hall Effect sensor and magnet. Assuming the load motor shaft and test motor shaft are aligned closely enough, the conical locator will ensure that the remaining offset is no more than:

$$x_{offset} \leq \frac{y_{gap}}{\tan\theta_{cone}}.$$

The coupling mechanism then runs through its routine: the load motor rotates at constant speed; magnets on both hubs increase the torque required to maintain that speed as they pass in front of each other; the torque sensor detects the increase in torque; the load motor moves a predetermined amount to ensure the coupling hubs are oriented correctly to engage safely; the screw motor drives the load emulator forward for a predetermined time with only enough torque to overcome the friction in the system; the tapered teeth correct any remaining torsional misalignment, while the conical locator corrects any remaining parallel misalignment; the coupling hubs are fully engaged and the shafts are concentric; the screw motor does not have enough torque to overcome the resistance from the fully engaged couplings and stalls until the time has elapsed. The system is now ready to test the selected motor in accordance with the customer's instructions.

The architecture for the load emulator in the present system has been verified. It was first used for the hardware-in-the-loop (HIL) simulation of robotic joints, as shown in FIG. 11. A standard 5 d.o.f. industrial robot was simulated using real hardware joint modules, with a torque motor providing the desired loading on the joint motors. The kinematics and dynamics of the manipulator was based on a computer simulation. It was found that the RHIL approach more closely approximated the behaviour of the robot than a purely computer-based simulation.

However, that application, while modular, was fixed in place. Test motors were fixed to the load motor via a spider coupling.

The invention claimed is:

1. A test platform for enabling the testing of one or more system components, the test platform comprising:
   (a) one or more test fixtures for mounting one or more system components that operate in rotational movement along one or more test axes;
   (b) a load emulator;
   (c) a coupling for linking the load emulator to a selected system component to enable a load to be applied to the selected system component; and
   (d) a positioning system operable to selectively position the coupling so as to link the load emulator to the selected system component, and to position the load emulator and the coupling to be aligned coaxially with the test axis of the selected system component when the load is applied.

2. The test platform as claimed in claim 1, wherein the coupling and the load emulator are disposed in a fixed coaxial position relative to one another.

3. The test platform as claimed in claim 2, wherein the positioning system further comprises:
   (a) a bracket for fixedly mounting the coupling and the load emulator;
   (b) at least one first rail, the bracket movable on the at least one first rail in a forward direction to engage the coupling to the selected system component and a backward direction to disengage the coupling from the selected system component; and
   (c) at least one second rail, the bracket moveable on the at least one second rail to selectively position the coupling and the load emulator coaxially with the one or more system components.

4. The test platform as claimed in claim 3, wherein the one or more test fixtures are disposed substantially linearly and perpendicular to the test axes, and wherein the at least one second rail is disposed parallel to the test axes.

5. The test platform as claimed in claim 3, wherein each of the one or more test fixtures comprises a magnet, and wherein the bracket comprises a Hall effect sensor to detect, by means of the one or more magnets, its position along the second rail.

6. The test platform as claimed in claim 3, wherein each of the one or more test fixtures comprises a bar code, and wherein the bracket comprises a bar code reader to detect, by means of the one or more bar codes, its position along the second rail.

7. The test platform as claimed in claim 1, wherein the load emulator is a torque motor.

8. The test platform as claimed in claim 7, wherein the test platform further comprises a reaction torque inducer mounted coaxially with the torque motor, the reaction torque inducer operable to provide feedback on torque applied by the load motor to the selected system component.

9. The test platform as claimed in claim 7, wherein the test platform further comprises a tachometer mounted coaxially with the torque motor, the tachometer operable to provide feedback on velocity of the load motor.

10. The test platform as claimed in claim 1, wherein the coupling comprises a tapered jaw assembly for eliminating torsional misalignment between the load emulator and the selected system component.

11. The test platform as clamed in claim 1, wherein the one or more system components are one or more motors.

12. The test platform as claimed in claim 11, wherein the test platform further comprises the one or more motors.

13. The test platform as claimed in claim 1, wherein the test platform enables the remote testing of the one or more system components over a network, the test platform further comprising:
   (a) a data acquisition interface operable to link the test platform to the network; and
   (b) a server linked to the network, the server operable to:
      (i) obtain from a customer one or more test parameters; and
      (ii) initiate, by means of the data acquisition interface, one or more tests of the one or more system components by applying the load to the one or more system components in accordance with the one or more test parameters and to obtain a test result.

14. The test platform as claimed in claim 13, wherein the server obtains the one or more test parameters from the customer by means of a client computer linked to the network.

15. The test platform as claimed in claim 14, wherein the server is further operable to communicate the test result to the customer by means of the client computer.

16. The test platform as claimed in claim 13, wherein the one or more test parameters configure the load emulator to apply a dynamic load profile to the one or more system components.

17. The test platform as claimed in claim 16, wherein the dynamic load profile is a constant load, a sinusoidal load or a custom load.

18. The test platform as claimed in claim 13, wherein the server includes a scheduling utility schedule the application of the one or more tests.

19. The test platform as claimed in claim 18, wherein a plurality of additional client computers are linked to the network and accessible by one or more additional customers, and wherein the scheduling utility is operable to schedule the application of one or more additional tests based on one or more additional test parameters provided by the one or more additional customers.

20. A test platform for enabling the testing of one or more system components, the test platform comprising:
   (a) one or more test fixtures for mounting one or more system components;
   (b) a load emulator;
   (c) a coupling for linking the load emulator to a selected system component to enable a load to be applied to the selected system component, said coupling comprising a tapered jaw assembly for eliminating torsional misalignment between the load emulator and the selected system component; and (d) a positioning system operable to selectively position the coupling so as to link the load emulator to the selected system component.

21. The test platform as claimed in claim 20, wherein the one or more system components operate in rotational movement along one or more test axes, and wherein the load emulator and the coupling are aligned coaxially with the test axis of the selected system component when the load is applied.

22. The test platform as claimed in claim 21, wherein the coupling and the load emulator are disposed in a fixed coaxial position relative to one another.

23. The test platform as claimed in claim 22, wherein the positioning system further comprises:
   (a) a bracket for fixedly mounting the coupling and the load emulator;
   (b) at least one first rail, the bracket moveable on the at least one first rail in a forward direction to engage the coupling to the selected system component and a backward direction to disengage the coupling from the selected system component; and
   (c) at least one second rail, the bracket moveable on the at least one second rail to selectively position the coupling and the load emulator coaxially with the one or more system components.

24. The test platform as claimed in claim 23, wherein the one or more test fixtures are disposed substantially linearly and perpendicular to the test axes, and wherein the at least one second rail is disposed parallel to the test axes.

25. The test platform as claimed in claim 23, wherein each of the one or more test fixtures comprises a magnet, and wherein the bracket comprises a Hall effect sensor to detect, by means of the one or more magnets, its position along the second rail.

26. The test platform as claimed in claim 23, wherein each of the one or more test fixtures comprises a bar code, and wherein the bracket comprises a bar code reader to detect, by means of the one or more bar codes, its position along the second rail.

27. The test platform as claimed in claim 20, wherein the load emulator is a torque motor.

28. The test platform as claimed in claim 27, wherein the test platform further comprises a reaction torque inducer mounted coaxially with the torque motor, the reaction toque inducer operable to provide feedback on torque applied by the load motor to the selected system component.

29. The test platform as claimed in claim 27, wherein the test platform further comprises a tachometer mounted coaxially with the torque motor, the tachometer operable to provide feedback on velocity of the load motor.

30. The test platform as claimed in claim 20, wherein the one or more system components are one or more motors.

31. The test platform as claimed in claim 30, wherein the test platform further comprises the one or more motors.

32. The test platform as claimed in claim 20, wherein the test platform enables the remote testing of the one or more system components over a network, the test platform further comprising:
   (a) a data acquisition interface operable to link the test platform to the network; and
   (b) a server linked to the network, the server operable to:
      (i) obtain from a customer one or more test parameters; and
      (ii) initiate, by means of the data acquisition interface, one or more tests of the one or more system components by applying the load to the one or more system components in accordance with the one or more test parameters and to obtain a test result.

33. The test platform as claimed in claim 32, wherein the server obtains the one or more test parameters from the customer by means of a client computer linked to the network.

34. The test platform as claimed in claim 33, wherein the server is further operable to communicate the test result to the customer by means of the client computer.

35. The test platform as claimed in claim 32, wherein the one or more test parameters configure the load emulator to apply a dynamic load profile to the one or more system components.

36. The test platform as claimed in claim 35, wherein the dynamic load profile is a constant load, a sinusoidal load or a custom load.

37. The test platform as claimed in claim 32, wherein the server includes a scheduling utility schedule the application of the one or more tests.

38. The test platform as claimed in claim 37, wherein a plurality of additional client computers are linked to the network and accessible by one or more additional customers, and wherein the scheduling utility is operable to schedule the application of one or more additional tests based on one or more additional test parameters provided by the one or more additional customers.

39. A test platform for enabling the testing of one or more system components, said testing including remote testing of the one or more system components over a network, the test platform comprising:
   (a) one or more test fixtures for mounting one or more system components;
   (b) a load emulator;
   (c) a coupling for linking the load emulator to a selected system component to enable a load to be applied to the selected system component;
   (d) a positioning system operable to selectively position the coupling so as to link the load emulator to the selected system component;
   (e) a data acquisition operable to link the test platform to the network; and
   (f) a server linked to the network, the server operable to:
      (i) obtain from a customer one or more test parameters; and
      (ii) initiate, by means of the data acquisition interface, one or more tests of the one or more system components by applying load to the one or more system components in accordance with the one or more test parameters and to obtain a test result.

40. The test platform as claimed in claim 39, wherein the one or more system components operate in rotational movement along one or more test axes, and wherein the load emulator and the coupling are aligned coaxially with the test axis of the selected system component when the load is applied.

41. The test platform as claimed in claim 40, wherein the coupling and the load emulator are disposed in a fixed coaxial position relative to one another.

42. The test platform as claimed in claim 41, wherein the positioning system further comprises:
   (a) a bracket for fixedly mounting the coupling and the load emulator;
   (b) at least one first rail, the bracket moveable on the at least one first rail in a forward direction to engage the coupling to the selected system component and a backward direction to disengage the coupling from the selected component; and (c) at least one second rail, the bracket movable on the at least one second rail to selectively position the coupling and the load emulator coaxially with the one or more system components.

43. The test platform as claimed in claim 42, wherein the one or more test fixtures are disposed substantially linearly and perpendicular to the test axes, end wherein the at least one second rail is disposed parallel to the test axes.

44. The test platform as claimed in claim 42, wherein each of the one or more test fixtures comprises a magnet, and wherein the bracket comprises a Hall effect sensor to detect, by means of the one or more magnets, its position along the second rail.

45. The test platform as claimed in claim 42, wherein each of the one or more test fixtures comprises a bar code, and wherein the bracket comprises a bar code reader to detect, by means of the one or more bar codes, its position along the second rail.

46. The test platform as claimed in claim 39, wherein the load emulator is a torque motor.

47. The test platform as claimed in claim 46, wherein the test platform further comprises a reaction torque inducer mounted coaxially with the torque motor, the reaction torque inducer operable to provide feedback on torque applied by the load motor to the selected system component.

48. The test platform as claimed in claim 46, wherein the test platform comprises a tachometer mounted coaxially with the torque motor, the tachometer operable to provide feedback on velocity of the load motor.

49. The test platform as claimed in claim 39, wherein the coupling comprises a tapered jaw assembly for eliminating torsional misalignment between the load emulator and the selected system component.

50. The test platform as claimed in claim 39, wherein the one or more system components are one or more motors.

51. The test platform as claimed in claim 50, wherein the test platform further comprises the one or more motors.

52. The test platform as claimed in claim 39, wherein the server obtains the one or more test parameters from the customer by means of a client computer linked to the network.

53. The test platform as claimed in claim 52, wherein the server is further operable to communicate the test result to the customer by means of the client computer.

54. The test platform as claimed in claim 39, wherein the one or more test parameters configure the load emulator to apply a dynamic load profile to the one or more system components.

55. The test platform as claimed in claim 54, wherein the dynamic load profile is a constant load, a sinusoidal load or a custom load.

56. The test platform as claimed in claim 39, wherein the server includes a scheduling utility schedule the application of the one or more tests.

57. The test platform as claimed in claim 56, wherein a plurality of additional client computers are linked to the network and accessible by one or more additional customers, and wherein the scheduling utility is operable to schedule the application of one or more additional tests based on one or more additional test parameters provided by the one or more additional customers.

* * * * *